March 7, 1967 — S. B. SIRERA — 3,307,236
MACHINE FOR THE MANUFACTURE OF ASBESTOS CEMENT PIECES
Filed Feb. 3, 1964 — 4 Sheets-Sheet 1

INVENTOR
SEBASTIAN BONET SIRERA
BY
ATTORNEYS

March 7, 1967  S. B. SIRERA  3,307,236
MACHINE FOR THE MANUFACTURE OF ASBESTOS CEMENT PIECES Filed Feb. 3, 1964  4 Sheets-Sheet 2

INVENTOR
SEBASTIAN BONET SIRERA
BY *Imrie & Smiley*
ATTORNEYS

INVENTOR
SEBASTIAN BONET SIRERA
BY Imirie & Smiley
ATTORNEYS

INVENTOR.
SEBASTIAN BONET SIRERA

BY

ATTORNEYS

United States Patent Office 3,307,236
Patented Mar. 7, 1967

3,307,236
MACHINE FOR THE MANUFACTURE OF
ASBESTOS CEMENT PIECES
Sebastian Bonet Sirera, Calle Conte Altea 4,
Valencia, Spain
Filed Feb. 3, 1964, Ser. No. 341,891
Claims priority, application Spain, Feb. 19, 1963,
285,244
3 Claims. (Cl. 25—84)

The present invention refers to a machine especially designed for the manufacture of pieces of asbestos cement, such as plain or undulated plates, and the like.

The machine of the invention has as its aim to advantageously replace the machinery used at present for the manufacture of asbestos cement pieces, like plates, etc., by which it is necessary to use belt conveyors provided with absorbent baizes for the humidity carried by the soft plates, which must thereafter be cut, squared and moulded forming the waves, if undulated plates are to be made. With the machine of the invention all these operaions are eliminated, since the making of the plate is performed directly on the moulds from which it comes out readily squared and cut, with straight and clean edges, the dehydration taking place also on the same moulds, in such a way that when coming out of the machine, it has the required rigidity and compactness. This makes it unnecessary to use baizes, which means a substantial saving in manufacturing cost, a minimized time for the production process and an important saving in hand work.

The machine of the invention comprises a number of superposed cases forming a pile, disposed between a base and top. These cases have vertical walls on both ends which form a prolongation of their sides, in such a way that with these walls two chambers are formed at both ends of the pile, these chambers being closed by two doors. The walls are hinge mounted, or may be otherwise removable, each of the chambers having corresponding openings for the introduction and for the exhaustion of air and for the inlet and outlet of fluid paste of asbestos cement. The central portion of each of these cases has a depression so disposed that when placing one case on top of the other, a number of ducts are formed communicating the chamber in one end of the duct with the chamber in the other end.

The bottom of each tunnel or duct, that is, of each case, has a corresponding water collecting cavity with longitudinal or transverse partition walls communicated with each other, this cavity being vented by means of a tube, all tubes of the water collecting boxes pouring into a common larger tube. Each cavity is covered by an assembly of filtering elements, resting on the partition walls, of the shape to be given to the piece being manufactured, these filters constituting the sedimentation and stratification surfaces of the fluid cement, asbestos and water mixture.

Inside each of the spaces, ducts or tunnels between every two cases, a movable compressing piece is placed, the bottom surface of which has a shape corresponding with the shape of the filtering sedimentation and stratification surface. The top surface of each piece has an extended pneumatic rubber bladder with a hole for the inlet and outlet of air. All movable pieces extend themselves over through the openings of the different tunnels or ducts existing between the cases, in such a way that all mentioned pieces are connected to corresponding columns which retain their disposition in horizontal parallel planes. These columns extend over the top part (or the bottom part) of the cover of the pile of boxes and are connected to the pistons of several pressing hydraulic cylinders, by means of which a slight vertical and alternate up and down movement is communicated to all movable parts, which move inside of the respective tunnels, ducts or spaces existing between every two cases.

The machine also comprises two devices to shake the fluid paste, one in each of the chambers formed by the assembly of cases, plus the supplementary tanks for mixing and supplying asbestos cement paste. In addition an air compressing installation and the appropriate air container is provided.

For the best understanding of the general features above explained, several sheets of drawings are annexed herewith, showing a machine constructed in accordance with the invention and appropriate for the manufacture of undulated plates, with the understanding that it is a mere example, with no sense of limitation at all.

Figure 1:
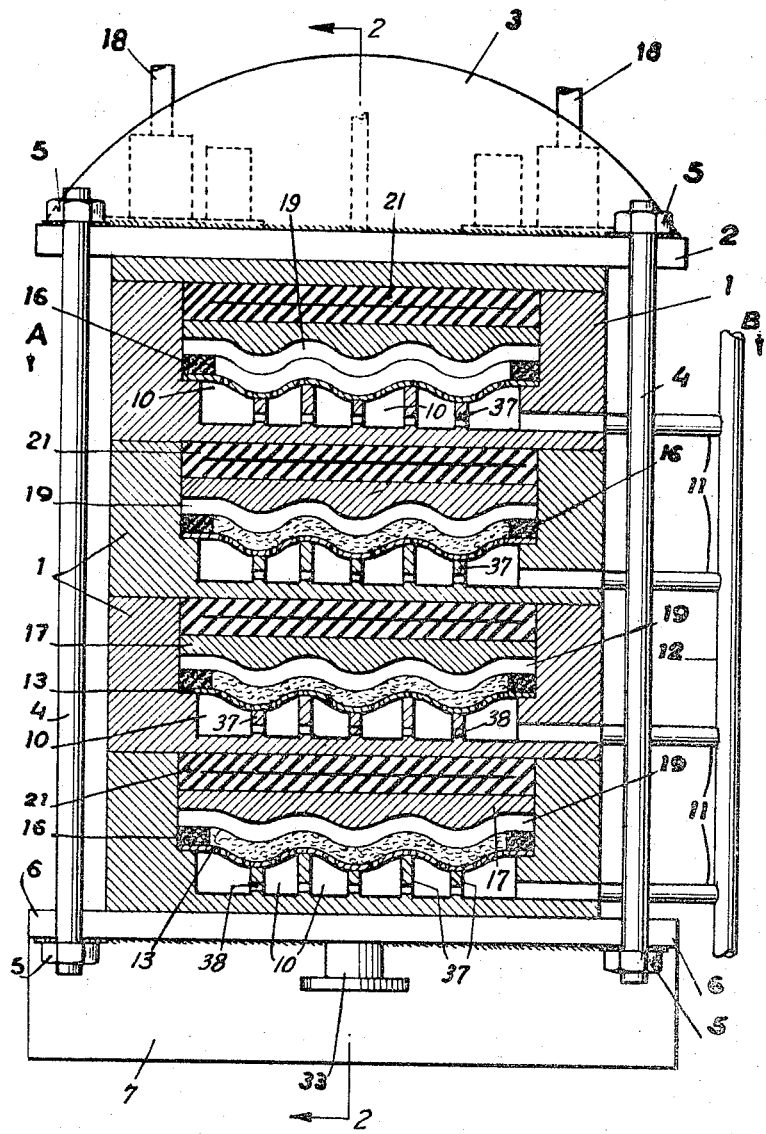
FIG. 1 is a tranverse cross sectional view showing the machine of the present invention, and disclosing four compression assemblies, the uppermost one thereof being devoid of material for disclosure of the moulding space.

According to the embodiment of the invention disclosed in the drawings, the machine represented, comprises the parts and elements which we shall refer to in the course of the following description using reference numerals to facilitate their identification.

The machine hereof comprises several cases 1 of rectangular plan superposed upon each other forming a pile, with a top cover 2 provided with transverse arched plates 3, like reinforcing nerves, said top cover being fixed to the supports of the base 6 of the container by means of long screws 4 with nuts 5, said base resting upon plates 7 arranged on edge.

Figure 3:
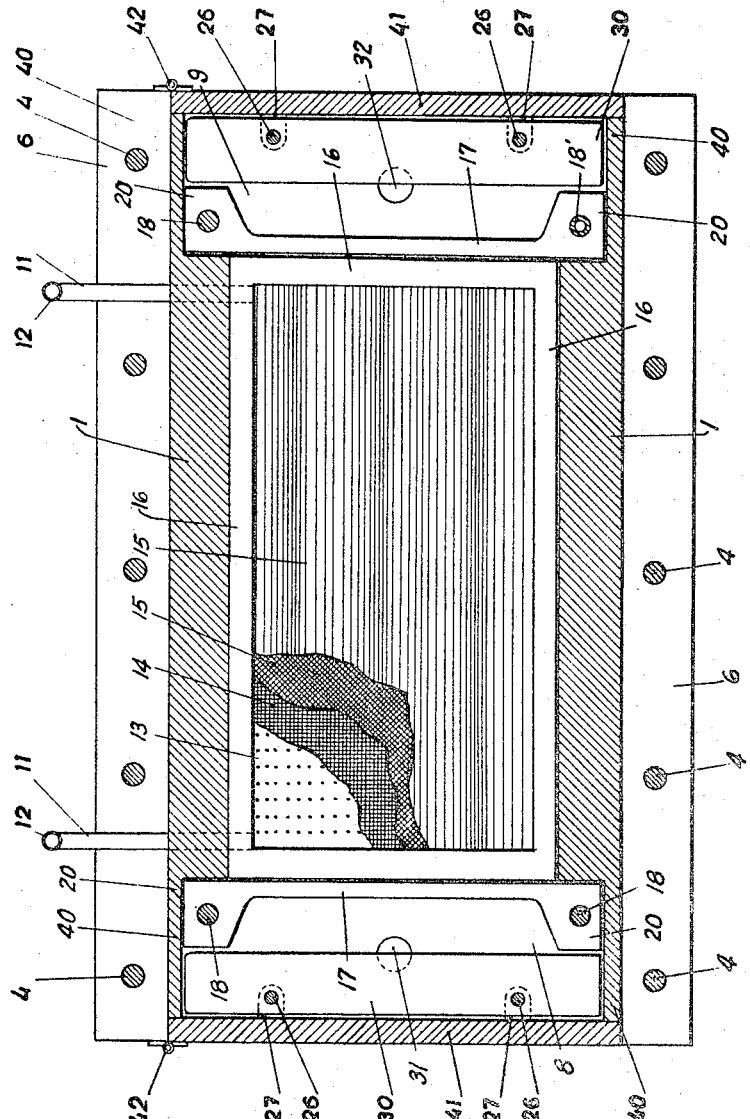
FIGURE 3 is a sectional view, partially broken away for disclosure of details, taken substantially on the section line A–B of FIGURE 1, looking in the direction of the arrows.

Each case 1 has a cavity 10 found in its central portion which, by means of two or more tubes 11, communicates the case with the outside of the assembly, all tubes 11 being connected with one or several vertical common tubes 12 (FIGS. 1 and 3). In the inside of each cavity 10 there are several partition walls 37 with perforations 38 communicating the several compartments, and resting on the walls 37 above each cavity 10 there is a plate 13 with a plurality of perforations therein which in the example I am referring to, is undulated, as corresponds to the manufacture of undulated plates, but which, for the manufacturing of plain plates or other articles, is correspondingly shaped. Upon this plate 13 there is a wire cloth 14 and upon the wire cloth there is a cloth 15 of any kind of synthetic fibers, making the whole of it a filtering assembly of a type conventional in the manufacture of asbestos cement articles, the arrangement of which is clearly seen in FIG. 3. In this figure the cloth 15 has a portion stripped in squares by oblique lines and the balance of it unstriped for further clearness. On the other figures, which show only sections, these three layers are not represented, showing only the plate with holes, in order to make it clearer. Around the cavity 10 and upon the filtering ensemble 13–14–15, there is a rubber band 16, preferably porous, which forms a frame and which must be of equal thickness to the desired thickness of the plate to be produced.

Each case has its cavity 10 limited transversally by partition walls 39 and the largest sides extending at both ends, forming two vertical parallel partition walls 40, with no bottom, in such a way that when placing the cases one on top of the other, two chambers 8–9 are formed at both ends of the pile. The chambers 8 and 9 are closed by the doors 41 which are movably mounted on the partition walls 40 by means of hinges 42 or by any other means capable of permitting the doors to open, or to be removed, and being provided with closing means and with hermetically sealed joints. Since the cavities 10 of each case 1 have their transverse walls 39 much lower than the other two longitudinal sides, a wide space or duct is formed between one case and the subsequent one, these ducts or tunnels serving to communicate the chambers 8 and 9 situated at each end of the pile of cases.

Figure 2:
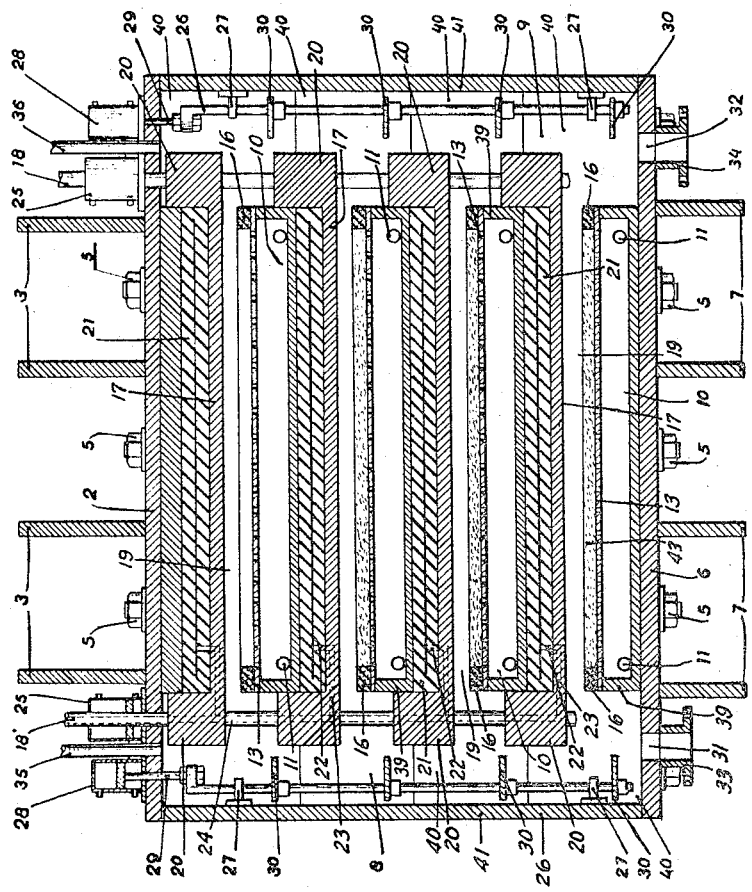
FIGURE 2 is a sectional view on the line 2—2 of FIGURE 1, looking in the direction of the arrows.

Between the rubber frame 16 of each case and the lower surface of the next superposed case 1, there is a large space which, as already said, forms a tunnel or duct in which is lodged the movable pieces 17, whose lower surfaces are formed with undulations, corresponding with the undulations of the filtering assembly 13–14–15. These movable pieces 17 extend through both ends of the cases 1 showing the portions 20, and through these extending portions 20 they are all connected or fixed by means of the rods 18 which keep them hanging in parallel planes situated between the cases 1, so that there is a space 19 between each mobile piece 17 and the correspondingly shaped frame 16 allowing the pieces 17 to move in it vertically (FIGS. 1 and 2).

Upon each movable piece 17 and between the extending portion 20 of each end, a depression is formed in which is lodged a pneumatic chamber 21, of rubber or of any other material. Each pneumatic chamber 21 has a hole 22 connecting with a duct 23 going through the body of the piece 17 and communicating in its turn with the duct 24 provided in the column or rod 18'.

The rods 18–18' are connected to the pistons of hydraulic pressure cylinders 25, by means of which the movable pieces 17, being connected to said rods, are raised and lowered at will as well as the pneumatic chambers 21 supported by them. This movement is of a few millimeters or centimeters and takes place in the inside of the tunnels or free spaces between every two cases 1.

In every one of the chambers 8 and 9 of the ensemble of cases 1, there is a shaking device for the fluid asbestos cement paste, constituted by two vertical rods 26 guided on the supports 27 and with possibilities of movement inside the same, by means of the hydraulic pressure cylinders 28 arranged on the upper part, having their shafts 29 connected to said rods. These rods have several shovels 30 so that when moving the rods vertically, said shovels 30 remove the fluid mass of asbestos cement then located in the chambers 8–9.

The openings 31 and 32 in the bottom of the chambers 8 and 9 together with the tubes 33–34 provide for infusion and evacuation, alternatively of the fluid paste to and from the said chambers 8 and 9.

There are also tubes 35 and 36 placed on the cover 2, which provide communication between the chambers 8 and 9 and the outside and serve to exhaust air from the said chambers and for the introduction of air under pressure in order to force the fluid paste of asbestos cement during the manufacturing process out of the chambers 8 and 9.

Figure 4:
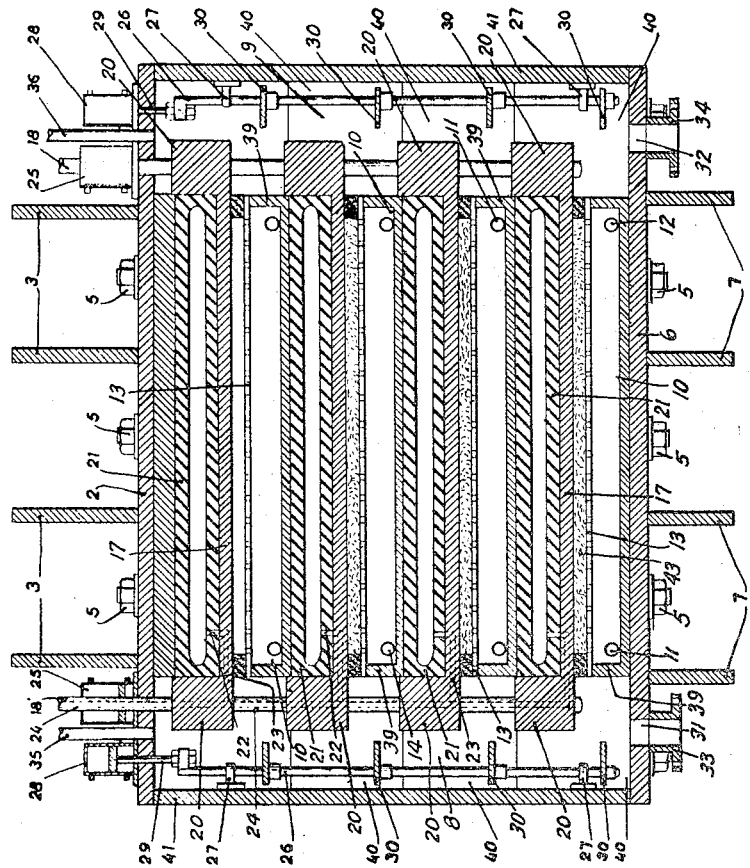
FIGURE 4 is a view similar to FIGURE 2 but showing the components in a different operative relationship.

The operation with the machine above described is as follows: by means of the hydraulic cylinders 25 the rods 18–18' are moved downwards until the movable pieces 17 contact the rubber frames 16, so that the extending portions 20 close the ducts or tunnels provided between the cases 1 cutting the communication to chambers 8 and 9, as shown in FIG. 4. This being done, free passage is permitted through tube 33 and opening 31 to the fluid paste from the feeding reservoirs and to fill the chamber 8, the air coming out of this chamber through tube 35. The cylinders 25 are again activated in reverse order and all the movable pieces 17 are raised until the pneumatic chambers 21 strike against the base of the cases 1, remaining in the position shown in FIGS. 1 and 2, thus clearing the spaces or ducts 19 through which the fluid paste passes into the chamber 9 whose bottom opening 32 remains closed while the top one 36 is open to let the air out. When the fluid paste passes over the filtering assembly 15–14–13, going from chamber 8 to chamber 9, a quantity of paste is retained between the rubber frames 16 and part of the water contained in the paste is removed as a result of gravitating into the container 10. The cylinders 25 are again activated and the movable pieces 17 are lowered and their undulated under surfaces press the paste sedimented between the rubber frames 16 and force it to dehydrate through the filters 15–14–13, flattening it and forming a thin layer or stratum. This pressure is obtained by injecting air through the ducts 24–23 and opening 22 into the pneumatic chambers 21 which inflate and push the pieces 17 against the frames 16 which, being of rubber, yield. The water squeezed from the compressed paste layer is collected in the containers 10 and from here it goes through the tubes 11 into the general collector 12, to be evacuated to the exterior. Now the by-pass valve of opening 31 is closed and the entrance valve for the paste through opening 32 is open, raising the movable pieces 17, having previously deflated the pneumatic chambers 21, thus the fluid paste of cement asbestos which enters the chamber 9 will go through the open spaces and ducts 19 to the chamber 8, part of this paste being retained through the rubber frames 16. The by-pass valve is then closed again to opening 32; the movable pieces 17 are lowered again and the pneumatic chamber 21 inflated, so that the paste is pressed by said pieces 17, forming another layer or stratum over the previous one, which will dehydrate through it and through the same ducts. Operating in this way successively, feeding the chambers alternately with paste, the paste is forced to pass over the dehydration cavities, and pressing it each time with the movable pieces 17 successive layers are set one after another until obtaining a plate 43 (FIG. 4), formed between the frames 16, which possesses the desired thickness, this being easily variable either by the number of pressings or by the extension of the rods 18–18'.

As soon as the undulated plate being manufactured has attained the desired thickness, the mobile pieces are lowered, and introducing air under pressure through the tubes 35 and 36 and keeping the by-pass valves of openings 31 and 32 open, the asbestos cement paste which may be remaining in the chambers 9 and 8 is evacuated, forcing it into the feeding containers through the appropriate ducts not shown in the drawings.

Finally, the pieces 17 are raised; one or both doors 41 are opened and the perforated plaques 13 are removed from the machine, these plaques carrying the asbestos cement plates 43 which have been formed between the frames 16, this operation being accomplished mechanically by any appropriate device.

Circumstances of sizes, materials, number of plates to be manufactured at the same time, shape of pieces to be manufactured, and constructive details of secondary nature, are optional within the scope of the invention as hereinafter delineated in the appended claims.

I claim:

1. A machine for the manufacture of plaques from paste substances which have the characteristic of hardening upon dehydration, the machine comprising:
   a plurality of cases arranged in superposed relation to form a pile thereof, each case having opposite ends and filter press means associated with the cases;
   a support base for the pile;
   a cover for the pile;
   elongated screw means connecting the cover and support case and securing the pile therebetween;
   substantially vertical wall means at the opposite ends of each case, said wall means including longitudinally extended portions;
   said extended portions of the respective cases being vertically aligned to collectively form chambers at the sides of the pile;
   articulated door means for each of the chambers;

means for the introduction and expelling of the paste substance for each of said chambers; and air inlet and exhaust means for each of the chambers.

2. A machine as defined in claim 1, wherein:

the cases each include a central portion;

the central portions of adjacent cases in the pile are spaced from one another to provide free spaces forming longitudinal duct means;

the longitudinal duct means being located in fluid communication with said chambers;

each case having a cavity formed therein and located within the free space thereof to collect moisture extracted from the case;

partition wall means within each of the cases and tube means therein, the wall and tube means directing the moisture;

collection tube means for the tubes of the respective cases;

a filter assembly for each case, said assemblies corresponding in configuration to the articles to be manufactured; and resilient frame means about the filter assembly, the frame means being of a height related to that of the articles.

3. A machine as defined in claim 2, wherein:

the cases each have mobile pieces movably mounted therein, said pieces having lower faces shaped to correspond to the configurations of the filter assemblies;

the mobile piece and filter assembly of each case acting together as conforming moulds for the paste;

the mobile pieces including upper faces with depressions formed therein;

an inflatable chamber means for each of the mobile pieces, to cause pressing and dehydration of the paste;

rod means mounted exteriorly of the cases;

means connecting the mobile pieces with the rod means; and hydraulic piston means for vertical movement of the rod means.

References Cited by the Examiner
UNITED STATES PATENTS

| | | | |
|---|---|---|---|
| 870,512 | 11/1907 | Hershiser | 100—194 XR |
| 1,084,659 | 1/1914 | Pistor et al. | 100—197 XR |
| 3,017,996 | 1/1962 | Riley | 100—198 XR |
| 3,098,429 | 7/1963 | Hagglund | 100—197 XR |
| 3,118,808 | 1/1964 | Marchioli et al. | 25—45 XR |

J. SPENCER OVERHOLSER, *Primary Examiner.*

R. SPENCER ANNEAR, *Assistant Examiner.*